United States Patent
Yen (10) Patent No.: US 9,362,664 B2
(45) Date of Patent: Jun. 7, 2016

(54) CONNECTING DEVICE AND ELECTRONIC DEVICE ASSEMBLY

(71) Applicant: KINGSTON DIGITAL, INC., Fountain Valley, CA (US)

(72) Inventor: Chin-Tang Yen, Hsinchu (TW)

(73) Assignee: Kingston Digital, Inc., Fountain Valley, CA (US)

( * ) Notice: Subject to any disclaimer, the term of this patent is extended or adjusted under 35 U.S.C. 154(b) by 0 days.

(21) Appl. No.: 13/845,230

(22) Filed: Mar. 18, 2013

(65) Prior Publication Data

US 2014/0220793 A1 Aug. 7, 2014

(30) Foreign Application Priority Data

Feb. 4, 2013 (TW) .............................. 102104170 A (51) Int. Cl.
*H01R 13/62* (2006.01)
*H01R 31/06* (2006.01)

(52) U.S. Cl.
CPC ............ *H01R 13/6205* (2013.01); *H01R 31/06* (2013.01); *H01R 2201/06* (2013.01)

(58) Field of Classification Search
CPC .................................................. H01R 13/6205
USPC ...................................................... 439/38–40
See application file for complete search history.

(56) References Cited

U.S. PATENT DOCUMENTS

| | | | | |
|---|---|---|---|---|
| 3,363,214 A * | 1/1968 | Wright | ............... | H01R 13/6205 439/180 |
| 6,897,370 B2 * | 5/2005 | Kondo | ................. | H02S 40/32 136/243 |
| 6,988,905 B2 * | 1/2006 | Corey | ................. | H01R 13/665 381/74 |
| 7,056,127 B2 * | 6/2006 | Suzuki | ............... | H01R 13/6205 439/22 |
| 7,066,739 B2 * | 6/2006 | McLeish | ............ | H01R 13/6205 439/39 |
| 7,074,046 B2 * | 7/2006 | Kernan | .............. | H01R 13/6271 439/39 |
| 7,264,479 B1 * | 9/2007 | Lee | ........................ | H01R 11/30 439/39 |
| 7,329,128 B1 * | 2/2008 | Awad | ................. | H01R 13/6205 439/38 |
| 7,354,315 B2 * | 4/2008 | Goetz | ................ | H01R 13/2428 439/638 |

(Continued)

FOREIGN PATENT DOCUMENTS

| TW | 201042853 A1 | 12/2010 |
|---|---|---|
| TW | M444558 U1 | 1/2013 |

(Continued)

OTHER PUBLICATIONS

Search Report to the corresponding United Kingdom Patent Application No. GB1401693.5 rendered by Intellectual Property Office of the United Kingdom on Jul. 17, 2014, 4 pages.

(Continued)

*Primary Examiner* — Ross Gushi
(74) *Attorney, Agent, or Firm* — Skaar Ulbrich Macari, P.A.

(57) ABSTRACT

A connecting device is disclosed, which includes a connector structure having a housing, a plug connector, a plurality of electrical contacts and a magnetic-metal set. The housing has a surface on which the electrical contacts and the magnetic-metal set are disposed, and the plug connector protrudes from the housing and is electrically connected to the electrical contacts. An electronic device assembly is further disclosed, which includes an electronic device and the aforesaid connecting device. The connecting device can be inserted into a socket connector of the electronic device, so as to transform the socket connector into a non-pluggable magnetic connector.

6 Claims, 7 Drawing Sheets

(56) References Cited

U.S. PATENT DOCUMENTS

| | | | | |
|---|---|---|---|---|
| 7,500,882 | B2* | 3/2009 | Goetz | H01R 13/2428 439/638 |
| 7,607,920 | B1* | 10/2009 | Chen | H01R 31/06 439/39 |
| 7,645,143 | B2* | 1/2010 | Rohrbach | H01R 13/6205 439/218 |
| 7,658,613 | B1* | 2/2010 | Griffin | H01R 13/6205 439/39 |
| 7,722,358 | B2* | 5/2010 | Chatterjee | G06F 3/03543 439/38 |
| 7,726,973 | B1* | 6/2010 | Perry | H01R 13/6205 439/39 |
| 7,874,844 | B1* | 1/2011 | Fitts, Jr. | H01R 13/6205 439/218 |
| 8,138,717 | B2* | 3/2012 | Chatterjee | G06F 3/03543 320/107 |
| 8,172,580 | B1* | 5/2012 | Chen | H01R 13/6205 320/111 |
| 8,412,861 | B2* | 4/2013 | Kim | H04M 1/6058 710/11 |
| 8,497,753 | B2* | 7/2013 | Difonzo | H01R 13/641 335/205 |
| 8,512,048 | B2* | 8/2013 | Yasuoka | H01R 13/447 439/39 |
| 8,619,433 | B2 | 12/2013 | Chiu | |
| 2002/0016088 | A1* | 2/2002 | Mendelson | H01R 13/6205 439/39 |
| 2003/0153353 | A1* | 8/2003 | Cupps | G06F 1/1626 455/556.1 |
| 2004/0252106 | A1* | 12/2004 | Koh | G06F 1/266 345/163 |
| 2007/0178771 | A1* | 8/2007 | Goetz | H01R 13/2428 439/669 |
| 2008/0311765 | A1* | 12/2008 | Chatterjee | G06F 3/03543 439/38 |
| 2010/0285674 | A1* | 11/2010 | David | H01R 13/6205 439/39 |
| 2011/0059623 | A1* | 3/2011 | Capece | H01R 13/7037 439/39 |
| 2011/0159705 | A1* | 6/2011 | Schmidt | H01R 11/30 439/39 |
| 2011/0189863 | A1* | 8/2011 | Sare | H01R 13/6205 439/39 |
| 2012/0135613 | A1* | 5/2012 | Chatterjee | G06F 3/03543 439/39 |
| 2012/0178991 | A1* | 7/2012 | Clark | A61B 1/00036 600/109 |
| 2013/0189855 | A1* | 7/2013 | Lai | H01R 11/30 439/39 |
| 2013/0273752 | A1* | 10/2013 | Rudisill | H01R 13/6205 439/39 |
| 2013/0285633 | A1* | 10/2013 | Johnson | H02M 3/156 323/282 |
| 2013/0323941 | A1* | 12/2013 | Zeliff | H01R 13/6205 439/39 |
| 2014/0024226 | A1* | 1/2014 | Augustinowicz | G06K 19/005 439/38 |
| 2014/0099801 | A1* | 4/2014 | Liao | H01R 13/6205 439/39 |
| 2014/0162468 | A1* | 6/2014 | Kim | H01R 13/6205 439/39 |
| 2014/0170864 | A1* | 6/2014 | Hwang | H01R 13/6205 439/38 |
| 2014/0220793 | A1* | 8/2014 | Yen | H01R 13/6205 439/39 |

FOREIGN PATENT DOCUMENTS

| | | |
|---|---|---|
| TW | M444661 U1 | 1/2013 |
| WO | 2009030436 A1 | 3/2009 |
| WO | 2013157788 A1 | 10/2013 |
| WO | 2013165049 A1 | 11/2013 |
| WO | 2013184906 A1 | 12/2013 |

OTHER PUBLICATIONS

Office Action to the corresponding Taiwan Patent Application rendered by Taiwan Intellectual Property Office (TIPO) on May 25, 2015, 8 pages (including English summary).

* cited by examiner

CONNECTING DEVICE AND ELECTRONIC DEVICE ASSEMBLY

PRIORITY

This application claims priority to Taiwan Patent Application No. 102104170, filed on Feb. 4, 2013, which is hereby incorporated herein by reference in its entirety.

FIELD

The present invention relates to a connecting device and an electronic device assembly, and more particularly, to a connecting device and an electronic device assembly that have a magnetic connecting interface.

BACKGROUND

Storage devices such as data storage devices (e.g., mobile disks or memory cards) or electric energy storage devices (e.g., mobile power supplier) are widely used in people's daily life and allow people to store, share and carry about data or to replenish electric energy conveniently.

Such storage devices generally comprise a plug connector, which can be plugged into a socket connector of other electronic devices (e.g., a notebook computer) to electrically connect the storage device and the electronic device with the storage device protruding from the electronic device.

As the storage device protrudes from the electronic device, the storage device might be inadvertently impacted. In case of a great impact force, the storage device will be damaged (e.g., due to fracture of the plug connector); and even worse, the impact force might cause the electronic device to be displaced together with the storage device and then fall off to the ground to result in damage of the electronic device.

Accordingly, a need exists in the art to provide a device that can make improvements on at least one of the aforesaid shortcomings.

SUMMARY

An objective of the present invention is to provide a connecting device, which can be used as a medium for data or electric energy transmission and can transform a plug connector of an electronic device into a non-pluggable magnetic connector so that it is less likely for the electronic device to be damaged when a peripheral device connected to the electronic device is impacted.

To achieve the aforesaid objective, the connecting device of certain embodiments of the present invention comprises a connector structure, which has a first housing, a plug connector, a plurality of first electrical contacts and a first magnetic-metal set. The first housing has a first surface on which the first electrical contacts and the first magnetic-metal set are disposed, and the plug connector protrudes from the first housing and is electrically connected to the first electrical contacts.

Another objective of certain embodiments of the present invention is to provide an electronic device assembly, comprising: an electronic device, having a socket connector; and the connector structure disclosed above, wherein the plug connector is inserted into a socket connector of the electronic device, and the first electrical contacts are located outside the electronic device.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

The present invention can be explained with reference to the following example embodiments. However, these example embodiments are not intended to limit the present invention to any specific examples, embodiments, environments, applications or implementations described in these embodiments. Therefore, description of these embodiments is only for purpose of illustration rather than to limit the present invention.

Figure 1:
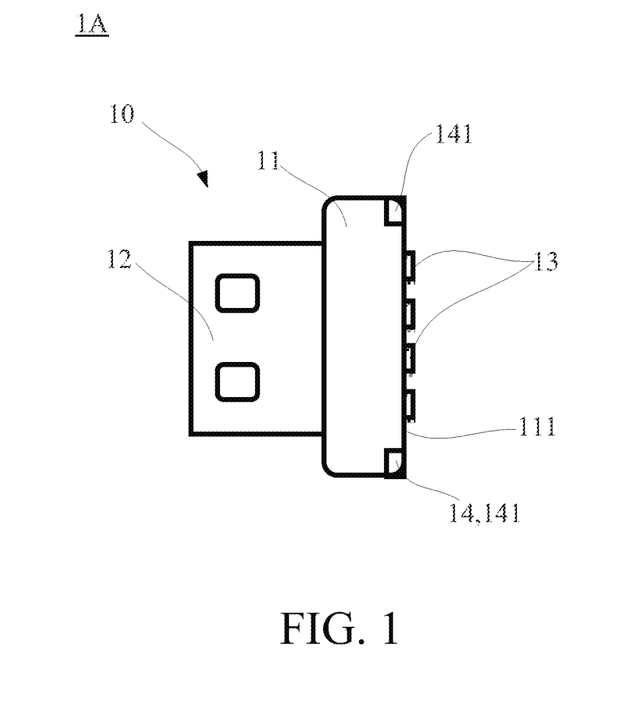
FIG. 1 is a schematic plan view of a connecting device according to a preferred embodiment of the present invention.
Figure 2:
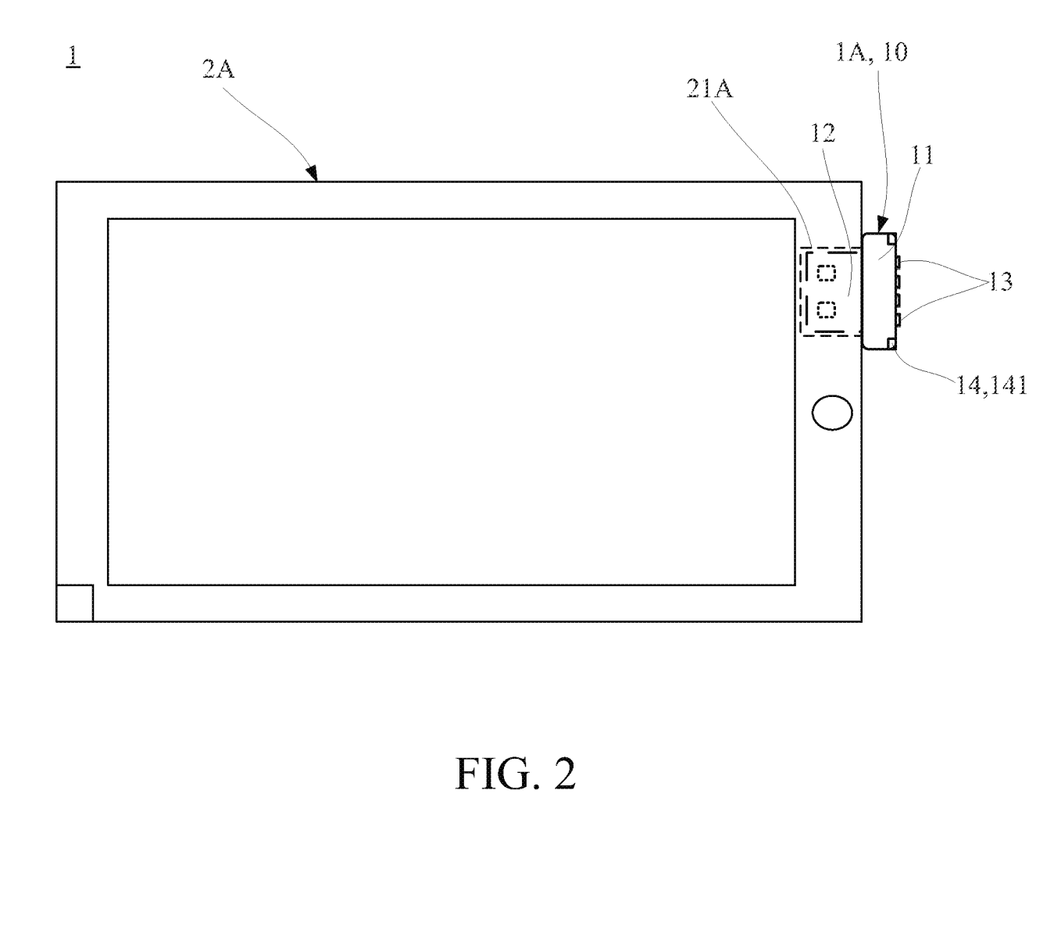
FIG. 2 is a schematic plan view of an electronic device assembly according to a preferred embodiment of the present invention.

FIG. 1 is a schematic plan view of a connecting device according to a preferred embodiment of the present invention, and FIG. 2 is a schematic plan view of an electronic device assembly according to a preferred embodiment of the present invention.

In preferred embodiments of the present invention, a connecting device 1A and an electronic device assembly 1 are proposed. Hereinbelow, the connecting device 1A will be described firstly, and then the electronic device assembly 1 will be described.

As shown in FIG. 1, the connecting device 1A comprises a connector structure 10, which has a first housing 11, a plug connector 12, a plurality of first electrical contacts 13 and a first magnetic-metal set 14. The first housing 11 may be a housing that is integrally formed, a housing formed of multiple pieces, a packaging body or the like. The first housing 11 has a first surface (e.g., a back surface), which is preferably a planar surface. The plug connector 12 may be a connector conforming to any specification (e.g., USB, Ethernet, HDMI or VGA), and protrudes from the first housing 11 (e.g., from a front surface of the first housing 11).

Each of the first electrical contacts 13 may be a metal contact, and the number of the first electrical contacts 13 may correspond to the number of pins of the plug connector 12. The first electrical contacts 13 are disposed on the first surface 111, and can be partly or wholly embedded into the first housing 11. The first electrical contacts 13 are also electrically connected with the plug connector 12, and the electrical connection therebetween may be implemented by metal terminals or transmission wires (not shown) disposed within the first housing 11.

Depending on the type of the plug connector 12, the first electrical contacts 13 may include a power contact, a ground contact and one or more signal contacts so that electric energy and signals can be transmitted.

The first magnetic-metal set 14 is disposed on the first surface 111 of the first housing 11, and may comprise one or more magnetic metals 141. In this embodiment, the first magnetic-metal set 14 comprises two magnetic metals 141. The two magnetic metals 141 may be disposed at outer sides of the first electrical contacts 13. In other words, the first electrical contacts 13 are disposed between the two magnetic metals 141. The two magnetic metals 141 may also be partly or wholly embedded into the first housing 11.

The two magnetic metals 141 may each be a metal that can be magnetically attracted, so the magnetic metals 141 may be of the following species: a paramagnetic metal, a ferromagnetic metal or a magnet. Furthermore, the magnetic metals 141 may be formed as a part of the first housing 11, or in other words, a part of the first housing 11 may be used as the magnetic metals 141; and in this case, the first house 11 as a whole may be formed of a paramagnetic metal, a ferromagnetic metal or a magnet, or at least the first surface 111 thereof is formed of a paramagnetic metal, a ferromagnetic metal or a magnet.

If each of the two magnetic metals 141 is a magnet, then the north-seeking poles of the two magnets are pointed toward two opposite orientations respectively. In other words, the north-seeking pole of one of the two magnets may be pointed toward a front side of the first housing 11, and the north-seeking pole of the other magnet may be pointed toward the back side of the first housing 11.

As shown in FIG. 2, the electronic device assembly 1 may comprise the aforesaid connecting device 1A and an electronic device 2A. The electronic device 2A may be an electronic device of any kind, e.g., a notebook computer, a mobile phone, a digital camera or the like (here a tablet computer is shown as an example), and has at least one socket connector 21A. The type of the socket connector 21A corresponds to that of the socket connector 12 of the connecting device 1A so that the plug connector 12 can be plugged into the socket connector 21A.

When the plug connector 12 has been plugged into the socket connector 21A, the first housing 11 of the connecting device 1A protrudes from the electronic device 2A, with the first electrical contacts 13 of the connecting device 1A and the first magnetic-metal set 14 being located outside the electronic device 2A. In other words, the first electrical contacts 13 and the first magnetic-metal set 14 will not enter the interior of the socket connector 21A.

By plugging the plug connector 12 into the socket connector 21A, the socket connector 21A of the electronic device 2A may be transformed into a non-pluggable magnetic connector. Then, even if there is no built-in magnetic connector in the electronic device 2A, the electronic device 2A can still be connected to other magnetic connectors or devices (e.g., connected to the storage structure 20 of the connecting device 1A) via the connector structure 10 of the connecting device 1. The storage structure 20 will be detailed as follows.

Figure 3:
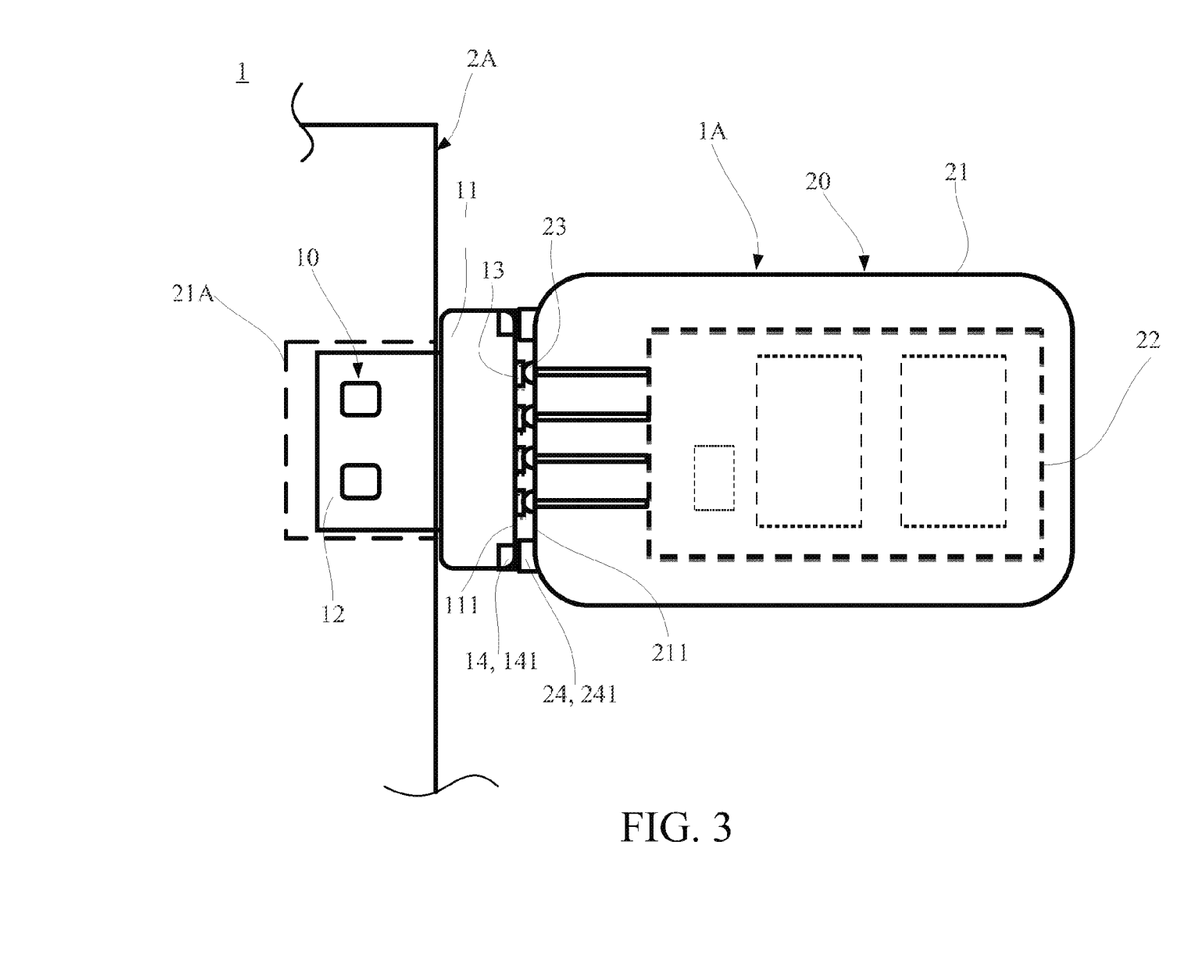
FIG. 3 is a schematic plan view of an electronic device assembly according to a preferred embodiment of the present invention, with the connecting device being attached.
Figure 4:
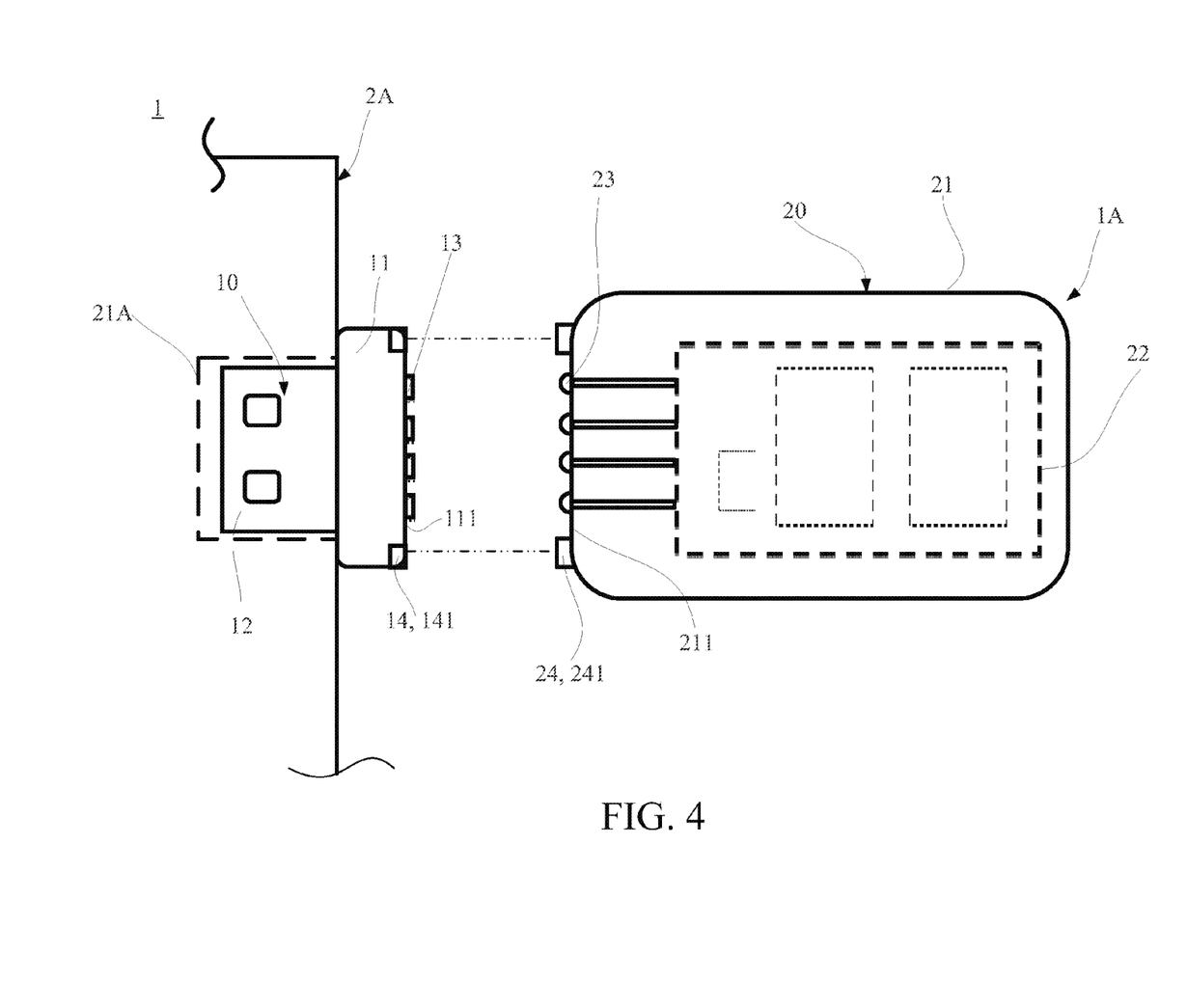
FIG. 4 is a schematic plan view of an electronic device assembly according to a preferred embodiment of the present invention, with the connecting device being detached.

Referring to FIG. 3 and FIG. 4, two schematic plan views of electronic device assemblies according to the present invention are shown therein respectively. The storage structure 20 of the connecting device 1A is used to store electronic data therein. The storage structure 20 may have a second housing 21, a data storage element 22, a plurality of second electrical contacts 23 and a second magnetic-metal set 24. The second housing 21 may be a housing that is integrally formed, a housing formed of multiple pieces, a packaging body or the like, and there is no particular limitation on the configuration thereof. The second housing 21 has a second surface 211 (e.g., a front surface), which is preferably a planar surface; and the second surface 211 can face toward the first surface 111 of the connector structure 10.

The data storage element 22 may comprise a memory chip or a solid-state hard disk for storing electronic data. The data storage element 22 may be disposed inside the second housing 21 to be sheltered and protected by the second housing 21. The second electrical contacts 23 may each be a metal contact, and are disposed on the second surface 211 of the second housing 21.

The second electrical contacts 23 may be partly or wholly embedded into the second housing 21, and the way in which the second electrical contacts 23 are arranged may correspond to that of the first electrical contacts 13. The second electrical contacts 23 and the data storage element 22 are electrically connected with each other, and the electrical connections therebetween may be implemented by a circuit board or transmission wires (not shown) disposed inside the second housing 21.

The second magnetic-metal set 24 is disposed on the second surface 211 of the second housing 21, and may comprise one or more magnetic metals 241. In this embodiment, the second magnetic-metal set 24 comprises two magnetic metals 241. The two magnetic metals 241 may be located at outer sides of the second electrical contacts 23. Each of the two magnetic metals 241 is a metal that can be magnetically attracted, so the magnetic metals 141 may be of the following species: a paramagnetic metal, a ferromagnetic metal or a magnet. Furthermore, the magnetic metals 241 may be formed as a part of the second housing 21, or in other words, a part of the second housing 21 may be used as the magnetic metals 241.

If each of the two magnetic metals 241 is a magnet, then the north-seeking poles of the two magnets are pointed toward two opposite orientations respectively. In other words, the north-seeking pole of one of the two magnets may be pointed toward a front side of the first housing 21, and the north-seeking pole of the other magnet may be pointed toward the back side of the first housing 21.

The storage structure 20 may be used to be joined with the connector structure 10, and is also detachable from the connector structure 10 after they are joined together. In detail, when the second housing 21 of the storage structure 20 comes close to the first housing 11 of the connector structure 10, the second magnetic-metal set 24 of the storage structure 20 and the first magnetic-metal set 14 of the connector structure 10 will be attracted toward each other to temporarily fix the second housing 21 to the first housing 11; and then when a force greater than the magnetic force generated therebetween is applied to the second housing 21 or the first housing 11, the second housing 21 and the first housing 11 can be detached from each other.

After the second housing 21 and the first housing 11 are joined with each other, the second electrical contacts 23 of the storage structure 20 make contact with the first electrical contacts 13 of the connector structure 10 respectively so that the data storage element 22 is electrically connected to the plug connector 12 of the connector structure 10. Then, the electronic device 2A can be electrically connected to the data storage element 22 of the storage structure 20 via the connector structure 10 to transmit data, signals or electric energy therebetween.

Connecting the connector structure 10 (or the electronic device 2A) and the storage structure 20 with each other by means of the magnetic force can achieve at least the following technical effects:

1. Because the storage structure 20 is temporarily fixed to the connector structure 10 by means of the magnetic force, the storage structure 20 will be detached from the connector structure 10 when being impacted by a great force. Thus, the storage structure 20 will not be damaged by a great stress resulting from the impact force, and it is difficult for the impact force to be transmitted to or applied on the connector structure 10 and the electronic device 2A.

2. In case the storage structure 20 is detached from the connector structure 10 due to an impact action, the storage structure 20 enters a power off status or a sleep status to prevent loss or corruption of the data stored in the data storage element 22. For example, if the storage structure 20 is in the form of an external hard disk, then when it is detached from the connector structure 10, the magnetic read/write head (not shown) will return to the original position to prevent damage of the magnetic tracks (not shown) due to falling off of the storage structure 20.

3. When both the magnetic metals 241 of the storage structure 20 and the magnetic metals 141 of the connector structure 10 are two magnets whose north-seeking poles are pointed toward directions opposite to each other, the storage structure 20 and the connector structure 10 can only be joined with each other in one direction. This can prevent false connection of the first metal contacts 13 and the second metal contacts 23 (i.e., prevent first metal contacts 13 and second metal contacts 23 that don't correspond to each other from making contact with each other).

4. When the storage structure 20 and the connector structure 10 are joined by the magnetic force, the first metal contacts 13 and the second metal contacts 23 can connect to each other automatically. Therefore, the users can easily line-up the storage structure 20 and the connector structure 10 without using much effort to align the first and second metal contacts 13 and 23.

It shall be noted that, the data storage element 22 of the storage structure 20 may be replaced by a battery 22 so that electric energy can be output by the storage structure 20 to the electronic device 2A as a standby power source of the electronic device 2A. Furthermore, the storage structure 20 may also comprise both the battery 20 and the data storage element 22 at the same time.

Figure 5:
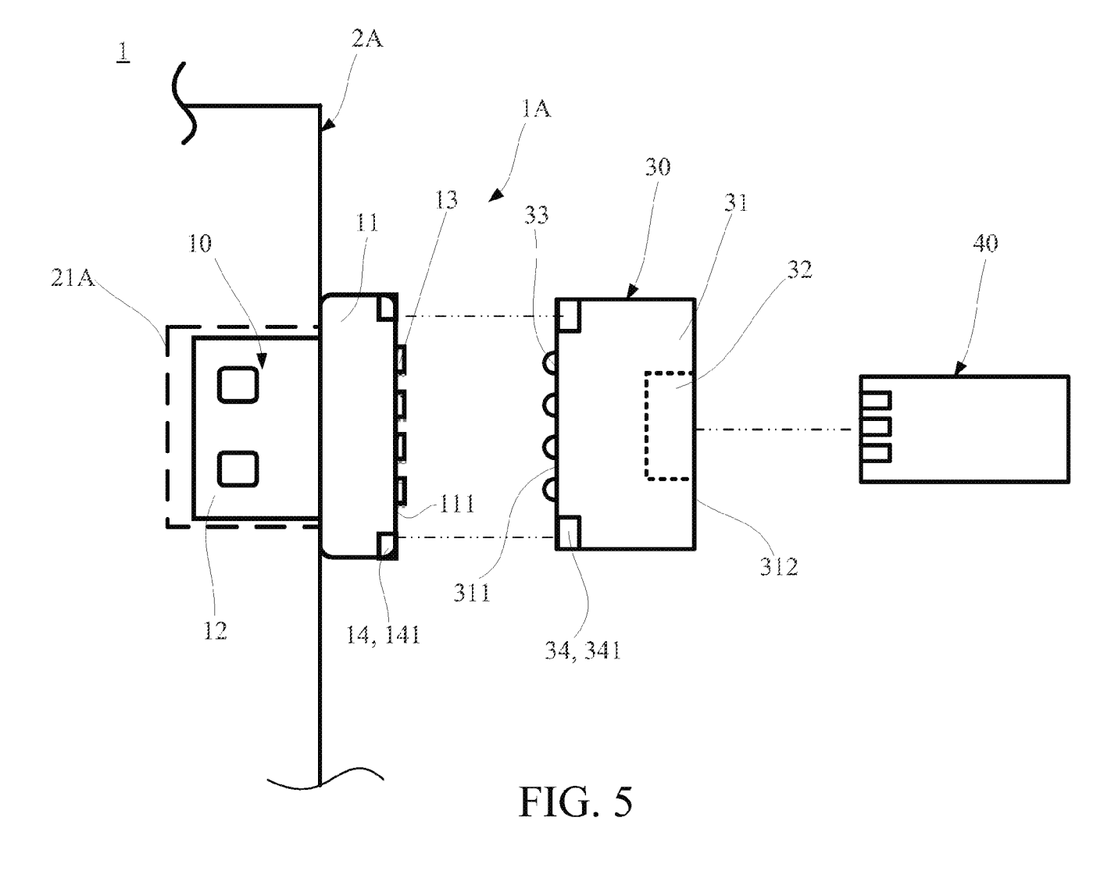
FIG. 5 is a schematic plan view of an electronic device assembly according to a preferred embodiment of the present invention, with the connecting device being detached.
Figure 6:
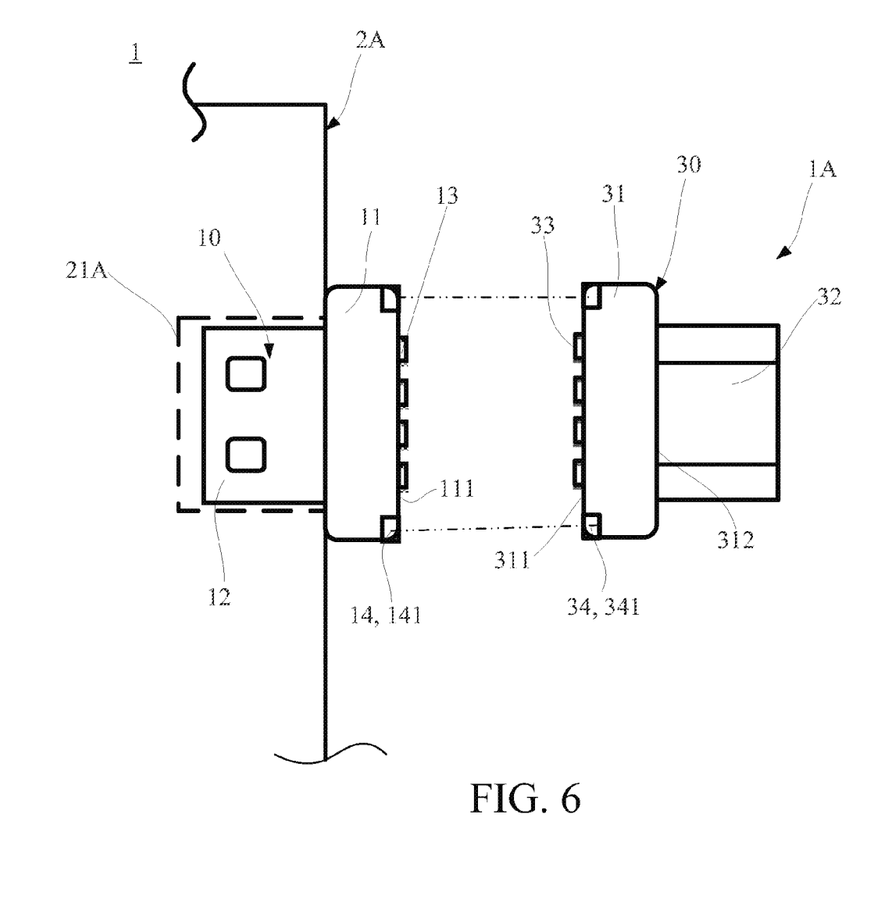
FIG. 6 is a schematic plan view of an electronic device assembly according to a preferred embodiment of the present invention, with the connecting device being detached.
Figure 7:
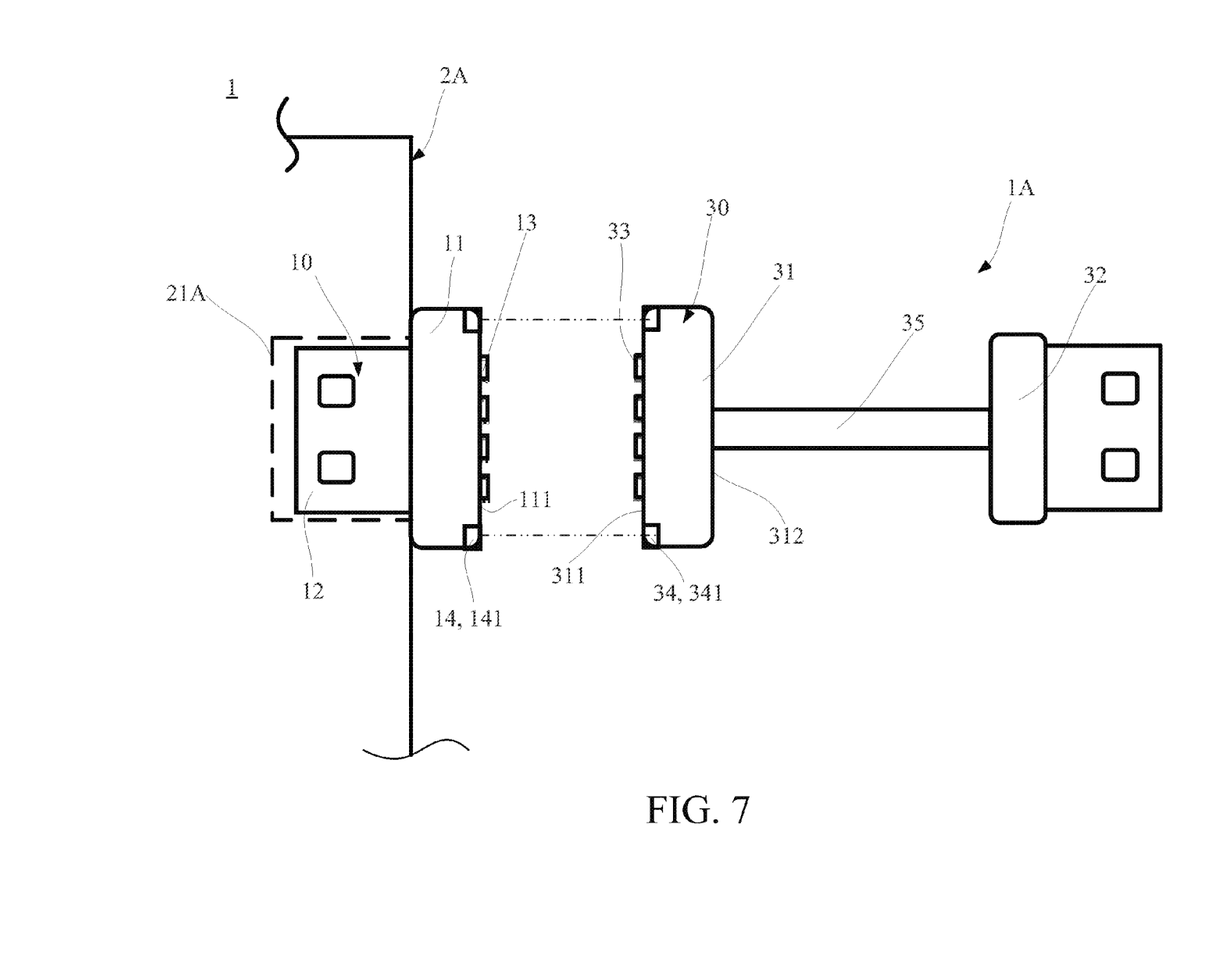
FIG. 7 is a schematic plan view of an electronic device assembly according to a preferred embodiment of the present invention, with the connecting device being detached.

Referring to FIG. 5 to FIG. 7, three schematic plan views of electronic device assemblies according to preferred embodiments of the present invention are shown therein respectively. Apart from being magnetically and electrically connected with the storage structure 20, the connector structure 10 of the connecting device 1A may also be magnetically and electrically connected with a second connector structure 30 of the connecting device 1A.

Similar to the storage structure 20, the second connector structure 30 also has a second housing 31, a plurality of second electrical contacts 33 and a second magnetic-metal set 34 (i.e., magnetic metals 341). However, the second connector structure 30 is different from the storage structure 20 in that: the second connector structure 30 has a second connector 32 but does not have a data storage element or a battery. Hereinbelow, only the difference between the second connector structure 30 and the storage structure 20 will be described, with similarities therebetween being omitted.

The second connector may be a connector conforming to any specification (e.g., USB, Ethernet, HDMI or VGA), and the specification that it conforms to may be different from that of the plug connector 12. The second connector 32 may be embodied in different forms: for example, it may be a plug connector (as shown in FIG. 5) or a socket connector (as shown in FIG. 6); it may be directly disposed on a third surface 312 of the second housing (as shown in FIGS. 5 and 6) or indirectly disposed on the third surface 312 via a signal transmission line 35 (as shown in FIG. 7). The third surface 312 may be, for example, a back surface or a top surface of the second housing 31.

The second connector structure 30 may be a card reader or an adaptor. That is, the second connector 32 of the second connector structure 30 may be firstly connected with a connector (not shown) of a memory card 40 or of another electronic device, and then the second connector structure 30 is connected with the connector structure 10 so that the memory card 40 or the another electronic device can be electrically connected to the electronic device 2A via the connecting device 1A.

According to the above descriptions, in the preferred embodiments of the present invention, the connector structure of the connecting device can transform a socket connector of an electronic device into a "non-pluggable magnetic connector" conveniently so that the electronic device can be connected with other magnetic connectors or units (e.g., the storage structure or the second connector structure of the connecting device); in other words, even if the electronic device is not provided with a built-in magnetic connector, a magnetic connector can also be obtained readily by means of the connector structure of the connecting device.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. A connecting device, comprising:
a connector structure having a first housing, a plug connector, a plurality of first electrical contacts and a first magnetic-metal set, wherein the first housing has a first surface on which the first electrical contacts are disposed, the first housing is formed of magnetic metal to be used as the first magnetic-metal set, and the plug connector protrudes from the first housing and is electrically connected to the first electrical contacts; and
a storage structure including a second housing, a data storage element within the second housing, a plurality of second electrical contacts and a second magnetic-metal set, wherein the second housing has a second surface that faces the first surface, the second electrical contacts and the second magnetic-metal set are disposed on the second surface, and the second electrical contacts are electrically connected to the data storage element;
wherein the first and second magnetic-metal sets are attracted toward each other to join the first and second housings, and thus the second electrical contacts make contact with the first electrical contacts respectively.
2. The connecting device of claim 1, wherein the first electrical contacts include a power contact, a ground contact and a signal contact.

3. The connecting device of claim 1, wherein the first magnetic-metal set comprises a plurality of magnetic metals, and the first electrical contacts are located between the magnetic metals.

4. The connecting device of claim 1, wherein the first magnetic-metal set comprises two magnets, and north-seeking poles of the two magnets are pointed toward two opposite orientations respectively.

5. The connecting device of claim 1, wherein the storage structure further includes a battery disposed within the second housing and electrically connected to the second electrical contacts.

6. An electronic device assembly, comprising:
   an electronic device, having a socket connector; and
   the connector device of claim 1, wherein the plug connector is inserted into the socket connector of the electronic device, and the first electrical contacts are located outside the electronic device.

\* \* \* \* \*